(12) United States Patent
Connor et al.

(10) Patent No.: US 11,550,606 B2
(45) Date of Patent: Jan. 10, 2023

(54) TECHNOLOGIES FOR DEPLOYING VIRTUAL MACHINES IN A VIRTUAL NETWORK FUNCTION INFRASTRUCTURE

(71) Applicant: Intel Corporation, Santa Clara, CA (US)

(72) Inventors: Patrick Connor, Beaverton, OR (US); Scott Dubal, Beaverton, OR (US); Chris Pavlas, Hillsboro, OR (US); Katalin Bartfai-Walcott, El Dorado Hills, CA (US); Amritha Nambiar, Beaverton, OR (US); Sharada Ashok Shiddibhavi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 821 days.

(21) Appl. No.: 16/131,012

(22) Filed: Sep. 13, 2018

(65) Prior Publication Data
US 2019/0042297 A1 Feb. 7, 2019

(51) Int. Cl.
*G06F 9/455* (2018.01)
*G06F 11/30* (2006.01)
*G06F 11/34* (2006.01)
*G06F 9/50* (2006.01)

(52) U.S. Cl.
CPC ........ *G06F 9/45558* (2013.01); *G06F 9/5027* (2013.01); *G06F 9/5077* (2013.01); *G06F 11/3065* (2013.01); *G06F 11/3409* (2013.01); *G06F 2009/4557* (2013.01); *G06F 2009/45591* (2013.01)

(58) Field of Classification Search
CPC ... G06F 2009/4557; G06F 2009/45591; G06F 11/3065; G06F 11/3409
See application file for complete search history.

(56) References Cited

U.S. PATENT DOCUMENTS 10,027,605 B2 * 7/2018 Agarwal ............. H04L 47/6295
2012/0167082 A1 * 6/2012 Kumar ................ G06F 9/45558
718/1

(Continued)

OTHER PUBLICATIONS

Extended European search report for European patent application No. 19183505.7, dated Nov. 27, 2019 (8 pages).

*Primary Examiner* — Douglas B Blair
(74) *Attorney, Agent, or Firm* — Compass IP Law PC (57) ABSTRACT

Technologies for deploying virtual machines (VMs) in a virtual network function (VNF) infrastructure include a compute device configured to collect a plurality of performance metrics based on a set of key performance indicators, determine a key performance indicator value for each of the set of key performance indicators based on the collected plurality of performance metrics, and determine a service quality index for a virtual machine (VM) instance of a plurality of VM instances managed by the compute as a function each key performance indicator value. Additionally, the compute device is configured to determine whether the determined service quality index is acceptable and perform, in response to a determination that the determined service quality index is not acceptable, an optimization action to ensure the VM instance is deployed on an acceptable host of the compute device. Other embodiments are described herein.

14 Claims, 6 Drawing Sheets

(56) References Cited

U.S. PATENT DOCUMENTS

| | | | |
|---|---|---|---|
| 2012/0246638 A1* | 9/2012 | He | G06F 9/45558 |
| | | | 718/1 |
| 2014/0259012 A1* | 9/2014 | Nandlall | H04L 67/34 |
| | | | 718/1 |
| 2014/0372723 A1* | 12/2014 | Bobroff | G06F 11/3433 |
| | | | 711/170 |
| 2015/0143367 A1 | 5/2015 | Jia et al. | |
| 2016/0380831 A1* | 12/2016 | Shevenell | H04L 41/12 |
| | | | 370/254 |
| 2017/0063652 A1* | 3/2017 | Wu | H04L 43/04 |
| 2018/0173547 A1 | 6/2018 | Stokes et al. | |
| 2019/0102213 A1* | 4/2019 | Yousaf | H04L 41/147 |
| 2019/0132211 A1* | 5/2019 | Yeung | H04L 41/0896 |
| 2020/0065208 A1* | 2/2020 | Vijendra | G06F 11/3447 |

* cited by examiner

TECHNOLOGIES FOR DEPLOYING VIRTUAL MACHINES IN A VIRTUAL NETWORK FUNCTION INFRASTRUCTURE

BACKGROUND

Network operators and service providers typically rely on various network virtualization technologies to manage complex, large-scale computing environments, such as high-performance computing (HPC) and cloud computing environments. For example, network operators and service provider networks may rely on network function virtualization (NFV) deployments to deploy network services (e.g., firewall services, network address translation (NAT) services, deep packet inspection (DPI) services, evolved packet core (EPC) services, mobility management entity (MME) services, packet data network gateway (PGW) services, serving gateway (SGW) services, billing services, transmission control protocol (TCP) optimization services, etc.).

Such NFV deployments typically involve placing virtual network functions (VNFs) on commercial off-the-shelf servers with general purpose hardware (e.g., to replace legacy, custom-purposed hardware). The VNFs are typically placed into various virtual machines (VMs) or containers to perform virtualized network services on network traffic and to manage the network traffic across the various VMs. Unlike traditional, non-virtualized deployments, virtualized deployments decouple network functions from underlying hardware, which results in network functions and services that are highly dynamic. As such, the VNFs can be scaled-in/out as necessary based on particular functions or network services to be performed on the network traffic. Network traffic is generally steered or otherwise distributed into the VNFs based on a protocol or an application identifier associated with the network traffic. However, certain conditions may exist that result in a VNF being overloaded and, as a result, network traffic being dropped, which can affect a subscriber's experience, violate a service level agreement (SLA), etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
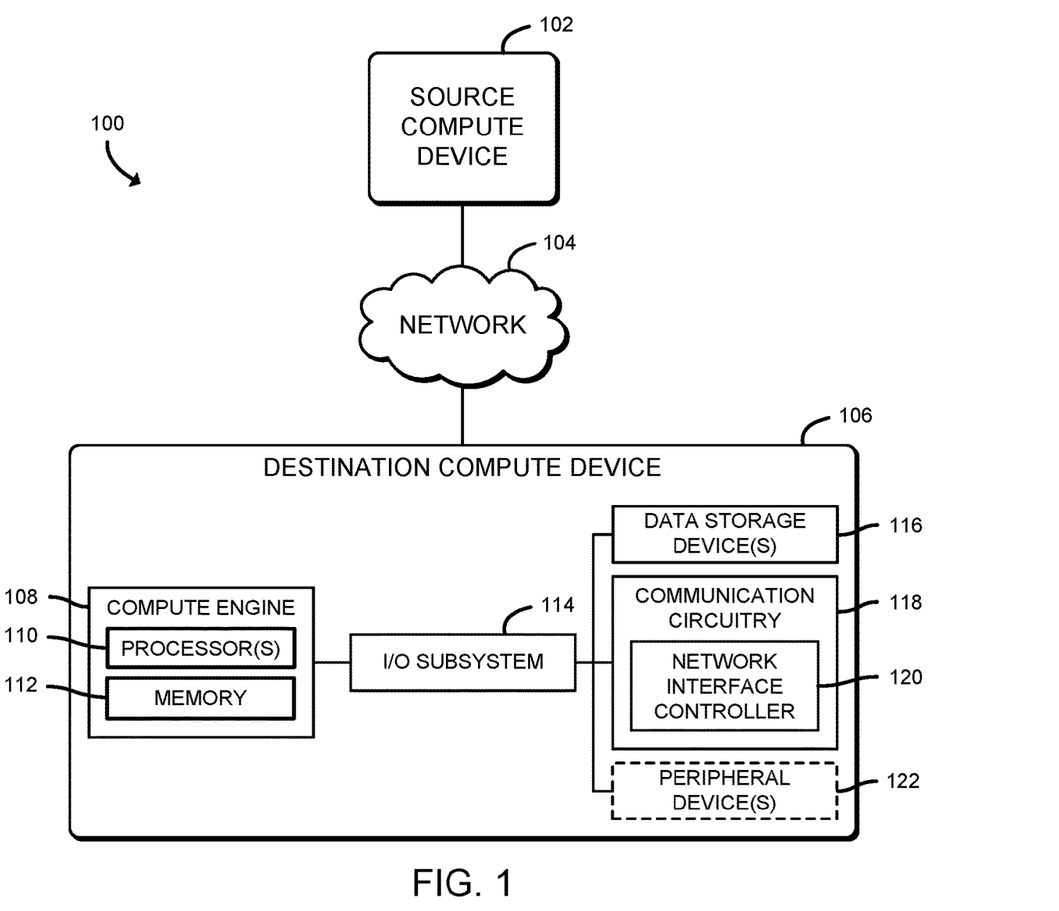
FIG. 1 is a simplified block diagram of at least one embodiment of a system for deploying virtual machines (VMs) in a virtual network function (VNF) infrastructure that includes a source compute device and a destination compute device communicatively coupled via a network.

Referring now to FIG. 1, in an illustrative embodiment, a system 100 for deploying virtual machines (VMs) in a virtual network function (VNF) infrastructure includes a source compute device 102 and a destination compute device 106 communicatively coupled via a network 104. While illustratively shown as having a single source compute device 102 and a single destination compute device 106, the system 100 may include multiple compute devices which may be identified as source or destination compute devices, depending on the path of a particular network packet. Accordingly, it should be appreciated that the source compute device 102 and the destination compute device 106 have been illustratively designated herein as being one of a "source" or a "destination" for the purposes of providing clarity to the description and that the source compute device 102 and/or the destination compute device 106 may be capable of performing any of the functions described herein. It should be further appreciated that the source compute device 102 and the destination compute device 106 may reside in the same data center or high-performance computing (HPC) environment. In other words, the source compute device 102 and the destination compute device 106 may reside in the same network 104, connected via one or more wired or wireless interconnects.

In use, the source compute device 102, or more particularly an application running on the source compute device 102, transmits network traffic (e.g., network packets, frames, etc.) to the destination compute device 106 over the network 104. Upon receipt of the network traffic, the destination compute device 106 typically performs some level of processing thereon, and then transmits the processed network packets to another compute device, such as the source compute device 102 or another compute device communicatively coupled to the destination compute device 106. It should be appreciated that each of the source compute device 102 and the destination compute device 106 may transmit/receive network traffic over the network 104, as applicable.

To perform the processing operations on the network traffic data, the destination compute device 106 is configured to create and deploy multiple virtual machines (VMs), on which one or more virtual network functions (VNFs) can be deployed. In network functions virtualization (NFV) architecture, a VNF is configured to handle specific network functions that run in one or more VMs on top of hardware networking infrastructure traditionally carried out by proprietary, dedicated hardware, such as routers, switches, servers, cloud computing systems, etc. Further, a VM is a software program or operating system that not only exhibits the behavior of a separate computer, but is also capable of performing tasks such as running applications and programs like a separate computer. A VM, commonly referred to as a "guest," is typically configured to run a dedicated operating system on shared physical hardware resources of the device on which the VM has been deployed, commonly referred to as a "host." Multiple virtual machines can exist within a single host at one time.

In use, the destination compute device 106 computes a service quality index that is usable to identify whether to and, if so, which optimization actions to perform in order to ensure each VM is deployed on the optimal host. To do so, as will be described in further detail below, the destination compute device 106 is configured to collect performance metrics of the various physical and virtual resources of the destination compute device 106, determine a set of key performance indicator values based on the collected performance metrics, and determine a service quality index for each VM as a function of the determined key performance indicator values. The destination compute device 106 is further configured to perform one or more optimization actions based on the computed service quality indicator for each VM. It should be appreciated that, in some embodiments, the destination compute device 106 may be configured to identify whether to and, if so, which optimization actions to perform in order to ensure each VM is deployed on the optimal host without the service quality index using one or more of the functions described herein. While the functionality described herein is being described relative to VMs, it should be appreciated that additional and/or alternative virtualization technologies may be used, such as containers, for example.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC (e.g., a host fabric interface (HFI)), a network appliance (e.g., physical or virtual), a web appliance, a distributed computing system, a processor-based system, a multiprocessor system, and/or a composable computing system (e.g., composable by an orchestrator). As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may otherwise be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA (e.g., reconfigurable circuitry), an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes the NIC 120, which may also be referred to as a host fabric interface (HFI) in some embodiments (e.g., high performance computing (HPC) environments). The NIC 120 may be embodied as any type of firmware, hardware, software, or any combination thereof that facilities communications access between the destination compute device 106 and a network (e.g., the network 104). For example, the NIC 120 may be embodied as one or more add-in-boards, daughtercards, network interface cards, controller chips, chipsets, or other devices that may be used by the destination compute device 106 to connect with another compute device (e.g., the source compute device 102).

In some embodiments, the NIC 120 may be embodied as part of a SoC that includes one or more processors, or included on a multichip package that also contains one or more processors. Additionally or alternatively, in some embodiments, the NIC 120 may include one or more processing cores (not shown) local to the NIC 120. In such embodiments, the processing core(s) may be capable of performing one or more of the functions described herein. In some embodiments, the NIC 120 may additionally include a local memory (not shown). In such embodiments, the local memory of the NIC 120 may be integrated into one or more components of the destination compute device 106 at the board level, socket level, chip level, and/or other levels. While not illustratively shown, it should be appreciated that the NIC 120 typically includes one or more physical ports (e.g., for facilitating the ingress and egress of network traffic) and, in some embodiments, one or more accelerator (e.g., ASIC, FPGA, etc.) and/or offload hardware components for performing/offloading certain network functionality and/or processing functions (e.g., a DMA engine).

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, a multiprocessor system, and/or a composable computing system (e.g., composable by an orchestrator). While not illustratively shown, it should be appreciated that source compute device 102 includes similar and/or like components to those of the illustrative destination compute device 106. As such, figures and descriptions of the like/similar components are not repeated herein for clarity of the description with the understanding that the description of the corresponding components provided above in regard to the destination compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
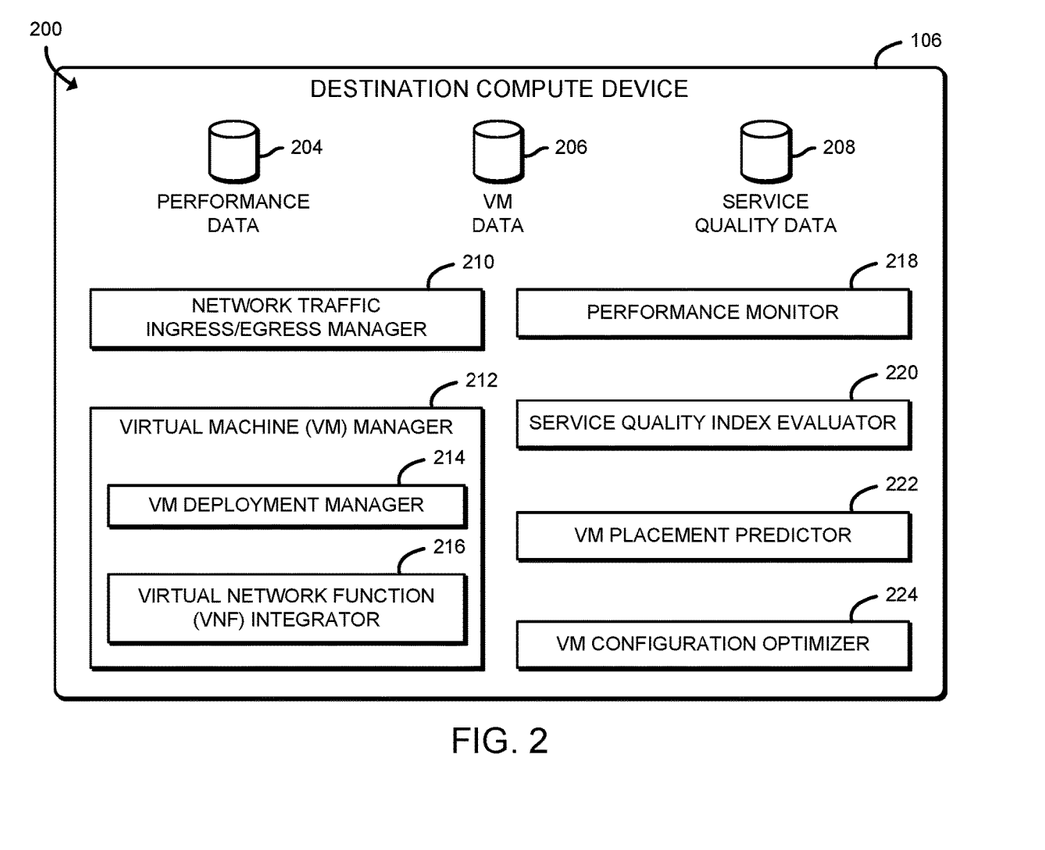
FIG. 2 is a simplified block diagram of at least one embodiment of an environment of the destination compute device of the system of FIG. 1.

Referring now to FIG. 2, in operation, the destination compute device 106 establishes an environment 200. The illustrative environment 200 includes a network traffic ingress/egress manager 210, a VM manager 212, a performance monitor 218, a service quality index evaluator 220, a VM placement predictor 222, and a VM configuration optimizer 224. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 210, VM management circuitry 212, performance monitor circuitry 218, service quality index evaluation circuitry 220, VM placement prediction circuitry 222, VM configuration optimization circuitry 224, etc.).

It should be appreciated that each of the one or more functions described herein as being performed by the network traffic ingress/egress management circuitry 210, the VM management circuitry 212, the performance monitor circuitry 218, the service quality index evaluation circuitry 220, the VM placement prediction circuitry 222, and/or the VM configuration optimization circuitry 224 may be performed, at least in part, by one or more components of the destination compute device 106, such as the compute engine 108, the I/O subsystem 114, the communication circuitry 118, an ASIC, a programmable circuit such as an FPGA, and/or other components of the destination compute device 106. It should be further appreciated that associated instructions may be stored in the memory 112, the data storage device(s) 116, and/or other data storage location, which may be executed by one of the processors 110 and/or other computational processor of the destination compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, or other software/hardware components of the destination compute device 106. It should be appreciated that the destination compute device 106 may include other components, sub-components, modules, sub-modules, logic, sub-logic, and/or devices commonly found in a computing device (e.g., device drivers, interfaces, etc.), which are not illustrated in FIG. 2 for clarity of the description.

In the illustrative environment 200, the destination compute device 106 additionally includes performance data 204, VM data 206, and service quality data 208, each of which may be accessed by the various components and/or sub-components of the destination compute device 106. Further, each of the performance data 204, the VM data 206, and the service quality data 208 may be accessed by the various components of the destination compute device 106. Additionally, it should be appreciated that in some embodiments the data stored in, or otherwise represented by, each of the performance data 204, the VM data 206, and the service quality data 208 may not be mutually exclusive relative to each other. For example, in some implementations, data stored in the performance data 204 may also be stored as a portion of one or more of the VM data 206 and/or the service quality data 208, or in another alternative arrangement. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 210, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 210 is configured to facilitate inbound network communications (e.g., network traffic, network packets, network flows, etc.) to the destination compute device 106. Accordingly, the network traffic ingress/egress manager 210 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith. Additionally, the network traffic ingress/egress manager 210 is configured to facilitate outbound network communications (e.g., network traffic, network packet streams, network flows, etc.) from the destination compute device 106. To do so, the network traffic ingress/egress manager 210 is configured to manage (e.g., create, modify, delete, etc.) connections to physical and virtual network ports/interfaces of the destination compute device 106 (e.g., via the communication circuitry 118), as well as the egress buffers/queues associated therewith.

The VM manager 212, which may be embodied as hardware, firmware, software, virtualized hardware, emulated architecture, and/or a combination thereof as discussed above, is configured to create and run virtual machines (VMs) on the destination compute device 106 for integration with VNFs. It should be appreciated that virtualization abstracts hardware (e.g., of the destination compute device 106) that allows multiple workloads to share a common set of resources. Accordingly, on shared virtualized hardware, a variety of workloads can co-locate while maintaining full isolation from each other, freely migrate across infrastructures, and scale as needed. Further, virtualization makes on-demand provisioning of services and software-defined orchestration of resources possible.

The illustrative VM manager 212 includes a VM deployment manager 214 and a VNF integrator 216. Each VM is configured to present a virtual operating platform to guest operating systems and manage the execution of the guest operating systems on the VMs. As such, multiple instances of a variety of operating systems may share the virtualized hardware resources of the destination compute device 106. It should be appreciated that the destination compute device 106 is commonly referred to as a "host" machine with "host" physical resources and each VM is commonly referred to as a "guest" machine with access to virtualized physical/hardware resources of the "host" machine. Depending on the embodiment, the VM manager 212 may be configured to create or otherwise manage the communications between virtual functions and virtual function drivers for assignment to the VMs.

The VM deployment manager 214 is configured to manage the creation and deployment of the VM instances. To do so, the VM deployment manager 214 is configured to identify resources (e.g., compute resources, memory resources, network resources, etc.) to be allocated to each VM instance. The VM deployment manager 214 is further configured to allocate the identified resources to the respective VM instance and configure each VM instance. Depending on the embodiment, the VM deployment manager 214 may be configured to configure each VM instance based on at least one characteristic of a VNF for which the VM instance is intended to be integrated with (e.g., based on a workload to be processed, a type of the VNF, etc.), which may be determinable from a configuration policy/template. The VM deployment manager 214 is additionally configured to register the deployed VM with a service orchestrator (see, e.g., the service orchestrator 306 of FIG. 3) of the destination compute device 106.

The VNF integrator 216 is configured to integrate a created VM with a VNF. In other words, the VNF integrator 216 is configured to configure each VM instance to process a workload associated with a VNF. It should be appreciated that each VNF is configured to represent a software implementation of a network function for processing network traffic workloads, including core telecommunication workloads such as Customer Premises Equipment (CPE), Evolved Packet Core (EPC), Mobility Management Entity (MME), etc., and standard enterprise workloads such as a firewall, a network address translation (NAT), a deep packet inspection (DPI), a packet data network gateway (PGW), a serving gateway (SGW), a transmission control protocol (TCP) optimizer, etc. Each VNF may include a plurality of VNF components having a plurality of types, with each VNF component being realizable by various technologies, including the VMs as described herein. In some embodiments, information associated with each VM/VNF may be stored in the VM data 206.

The performance monitor 218, which may be embodied as hardware, firmware, software, virtualized hardware, emulated architecture, and/or a combination thereof as discussed above, is configured to collect performance information (e.g., network performance information, processor performance information, memory performance information, orchestrator performance information, and VNF performance information, etc.) for physical and virtual resources of the destination compute device 106 using various metrics at heterogeneous workloads. For example, the performance monitor 218 is configured to collect network metrics, hardware metrics (e.g., processor metrics, memory metrics, etc.) orchestrator metrics, and VNF metrics. To do so, the performance monitor 218 is configured to collect network metrics at various levels of virtualization (e.g., at a physical switch, a physical NIC, an uplink, a virtual switch (vSwitch)/VEB, a virtual NIC (vNIC), the data plane, etc.). The network metrics may include any data that can be collected that is associated with the network performance, including network traffic processing related statistics, ingress/egress queue related information, receive/transmit counters on MAC and physical layers, etc.

The processor metrics may include any data that can be collected that is associated with performance of a respective processor of the destination compute device 106, including utilization data (e.g., processor utilization metrics). Depending on the embodiment, the performance monitor 218 may use one or more profiling tools to gather the processor utilization metrics, including response time, wait time, etc., for determining scheduling trends, utilization percentages, etc. The memory metrics may include any data that can be collected that is associated with performance of a respective memory of the destination compute device 106, such as the cache, main memory, secondary memory, etc. For example, the memory metrics may include host/guest memory usage data, page sharing, memory bandwidth monitoring, compression related data, etc. It should be appreciated that, depending on the embodiment, additional and/or alternative platform resource metrics may be collected, including temperature data, power usage, adjacency data (e.g., NIC/processor adjacency), etc.

It should be appreciated that, in NFV architecture, the services delivered to end users by individual VNF instances are dependent on the service quality of the VM instance that hosts the VNF component and the virtual network service that connects to other VNF instances. As such, it should be further appreciated that VM provisioning latency and VM provisioning reliability are important factors affecting the end users experience for the services delivered by VNF instances. Accordingly, the orchestrator metrics may include any information that is usable to determine the VM provisioning latency and reliability, such as a number of registered services, service lookup times, a client discovery count, connection retries, connection failures, and/or any other platform and VNF telemetry data. The VNF metrics may include any data that can be collected that is associated with a VM instance, such as a VM stall count, a VM premature release ratio, a VM scheduling latency, a network packet processing latency, a network packet delivery latency, a VM clock error applied when the target VM becomes available to serve VNF users until the VM is released, etc. In some embodiments, the metrics/performance information may be collected via a resource management enabled platform, such as the Intel® Resource Director Technology (RDT) set of technologies (e.g., Cache Allocation Technology (CAT), Cache Monitoring Technology (CMT), Code and Data Prioritization (CDP), Memory Bandwidth Management (MBM), etc.) to monitor and collect the telemetry data. Additionally, in some embodiments, the collected metrics/performance information may be stored in the performance data 204.

The service quality index evaluator 220, which may be embodied as hardware, firmware, software, virtualized hardware, emulated architecture, and/or a combination thereof as discussed above, is configured to determine a service quality index for each VM that estimates a potential impact on performance of a VM relative to current performance conditions. In other words, the service quality index captures the context information (workload description, fine-grained resource usage, related pitfalls, etc.) that might have performance implications. Accordingly, the service quality index can be used to generate performance predictions which enable optimizations to be undertaken on the hardware.

To determine the service quality index, the service quality index evaluator 220 is configured to identify a set of key performance indicators associated with the VM instance for which the service quality index is to be determined. The key performance indicators may include any type of metric that is usable to quantify a performance level to be evaluated. For example, to monitor device health, the key performance indicators can include delay, jitter, throughput, packet loss, transmission/receive errors, resource (e.g., processor and memory utilization). Additionally, at the orchestration layer, the key performance indicators can include a VM provisioning latency and a VM provisioning reliability. At the VNF level, for example, the key performance indicators can include a VM stall count, a VM premature release ratio, a VM scheduling latency, a network packet processing latency, a network packet delivery latency, a VM clock error to identify faults and service impairment, etc. Accordingly, the service quality index evaluator 220 is configured to use the collected performance information (e.g., as may be collected by the performance monitor 218 based on the key performance indicators) as input variables to compute the service quality index.

Additionally, the service quality index evaluator 220 is configured to identify a weight (e.g., based on a priority, a level of importance, etc.) of each key performance indicator relative to the other key performance indicators. For example, jitter may have a higher weight for a particular workload/application type (e.g., a voice over IP (VOIP) application, a video application, a real-time application, an augmented reality application, etc.) and a lower weight for another workload/application type (e.g., a web service based workload. Accordingly, the service quality index evaluator 220 is configured to compute the service quality index based on the set of key performance indicators and their respected weights, such as may be computed using the following formula:

$$SQI = \sum_{i=1}^{N} G_i * W_i * KPI_i$$

wherein "N" is the number of key performance indicators considered for a given workload type, "$G_i$" is the gain for the "$i^{th}$" key performance indicator corresponding to the performance delta as described herein, and "$W_i$" is the weight for the "$i^{th}$" key performance indicator. It should be appreciated that, depending on the embodiment, the data can be input to a machine learning operation which monitors, learns, and analyzes the data over the time, such that historical results can be used in determining the service quality index, as well as the presently collected state information. In some embodiments, the determined service quality index, key performance indicators, and/or other information related thereto may be stored in the service quality data 208.

The VM placement predictor 222, which may be embodied as hardware, firmware, software, virtualized hardware, emulated architecture, and/or a combination thereof as discussed above, is configured to predict an optimal host placement for each VM instance (e.g., optimal relative to the alternative placement options). It should be appreciated that the optimal host may be any host that meets the criteria for placement (e.g., an acceptable host whose service quality index is greater than or equal to a minimum acceptable service quality level), rather than the "most" optimal host (e.g., the highest rated host). To predict the optimal host placement for each VM instance, the VM placement predictor 222 is configured to analyze the service quality index for each VM instance to ensure that the selected placement is the optimal placement. The VM placement predictor 222 may be configured to compare the service quality index to a threshold minimum service quality index, such as may be determined from a service level agreement (SLA) that includes information usable to determine the threshold minimum service quality index. It should be appreciated that the VM placement predictor 222 may be configured to identify the optimal placement for each VM instance on creation and/or at various time intervals during the lifetime of the respective VM instance, depending on the embodiment.

The VM configuration optimizer 224, which may be embodied as hardware, firmware, software, virtualized hardware, emulated architecture, and/or a combination thereof as discussed above, is configured to determine whether any optimizations can be performed on the hardware for each VM instance based on the respective service quality index. In other words, the VM configuration optimizer 224 is configured to use the service quality index to generate performance predictions which enable optimizations on the hardware of the destination compute device 160. For example, such optimizations can include turning on hardware offloads, supporting large pages, adjusting the memory access priority, data plane processor pinning, and/or any other relevant enhanced platform awareness features.

Additionally, real time hardware configuration changes can be made by the VM configuration optimizer 224, based on the service quality index, to create optimized flows based on the current workload request. As such, the performance delta may be adjusted, which can result in an updated service quality index that is usable to refine the location selection for placement of a VM instance. For example, faults such as VM stalls can lead to lower performance and a lower service quality index. This may not be acceptable to end users of the VNF instances running on the respective VM instance. Such an indication may initiate the VM configuration optimizer 224 to assess the impact, root-cause the stall event, and activate failover mechanisms where the VM is then placed at a location where the duration or frequency of the stall is mitigated (e.g., as may be determined by the VM placement predictor 222).

Figure 3:
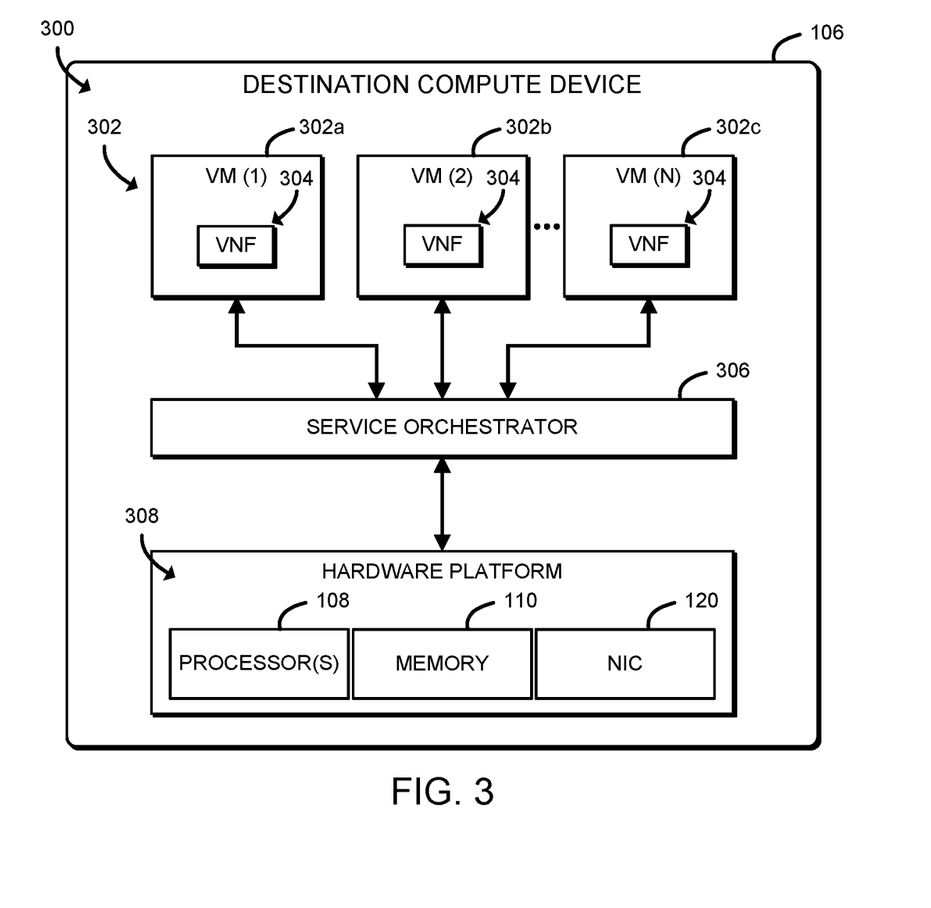
FIG. 3 is a simplified block diagram of at least one other embodiment of an environment of the destination compute device of the system of FIG. 1.

Referring now to FIG. 3, in use, the destination compute device 106 establishes an environment 300 during operation. The illustrative environment 300 includes multiple VM instances 302 communicatively coupled to a service orchestrator 306, which is further communicatively coupled to the hardware platform 308. The illustrative VM instances 302 include a first VM instance 302 designated as VM (1) 302a, a second VM instance 302 designated as VM (2) 302b, and a third VM instance 302 designated as VM (N) 302c (i.e., the 7"Nth" VM instance of the VM instances 302, wherein "N" is a positive integer and designates one or more additional VM instances 302). As illustratively shown, each of the VM instances 302 includes a VNF component 304 running on the respective VM instance 302.

The service orchestrator 306, which may be embodied as hardware, firmware, software, virtualized hardware, emulated architecture, and/or a combination thereof, is configured to orchestrate the provisioning and placement of each VM instance, as well as the respective VNF component 304. The illustrative hardware platform 308 includes the processor(s) 108, the memory 112, and the NIC 120 of FIG. 1.

However, it should be appreciated that the hardware platform 308 may include any additional hardware resources of the destination compute device 106, which are not shown for clarity of the description.

Figure 4:
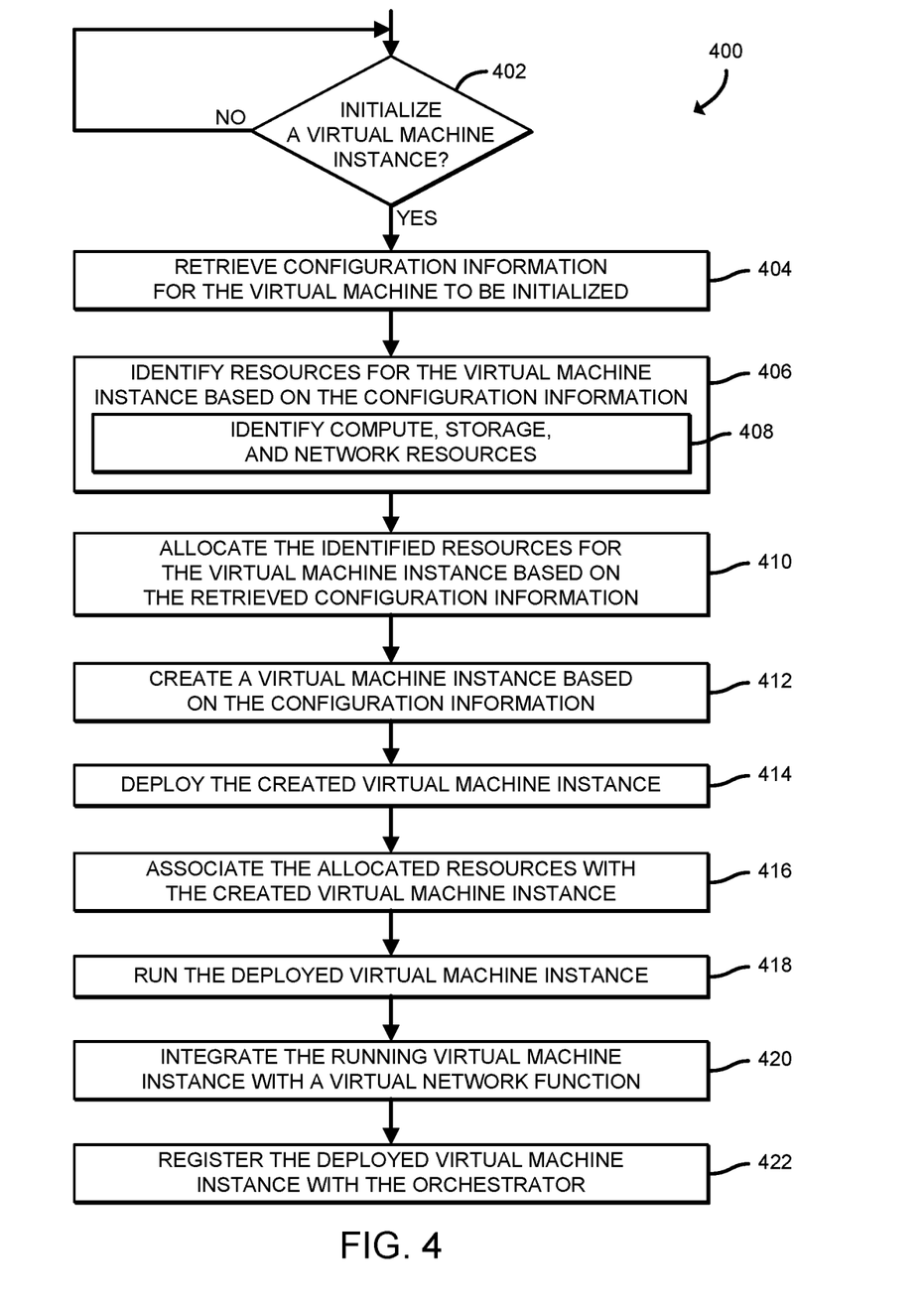
FIG. 4 is a simplified flow diagram of at least one embodiment of a method for initializing a VM host instance in the VNF infrastructure that may be executed by the destination compute device of FIGS. 1-3.

Referring now to FIG. 4, a method 400 for initializing a VM instance (e.g., one of the VM instances 302 of FIG. 3) in a VNF infrastructure is shown, which may be executed by a compute device (e.g., the destination compute device 106 of FIGS. 1-3). The method 400 begins with block 402, in which the destination compute device 106 determines whether to initialize a VM instance. If so, the method 400 advances to block 404, in which the destination compute device 106 retrieves configuration information for the VM instance to be initialized. In block 406, the destination compute device 106 identifies resources for the virtual machine instance. For example, in block 408, the destination compute device 106 identifies compute, storage, network, and any other physical and/or virtual resources. In block 410, the destination compute device 106 allocates the identified resources for the virtual machine instance based on the configuration information.

In block 412, the destination compute device 106 creates a virtual machine instance based on the configuration information. In block 414, the destination compute device 106 deploys the created virtual machine instance. In block 416, the destination compute device 106 associates the allocated resources with the created virtual machine instance. In block 418, the destination compute device 106 runs the deployed virtual machine instance (e.g., using the allocated resources). In block 420, the destination compute device 106 integrates the running virtual machine instance with a VNF. In block 422, the destination compute device 106 registers the deployed virtual machine instance with the orchestrator (e.g., the service orchestrator 306 of FIG. 3).

Figure 5A:
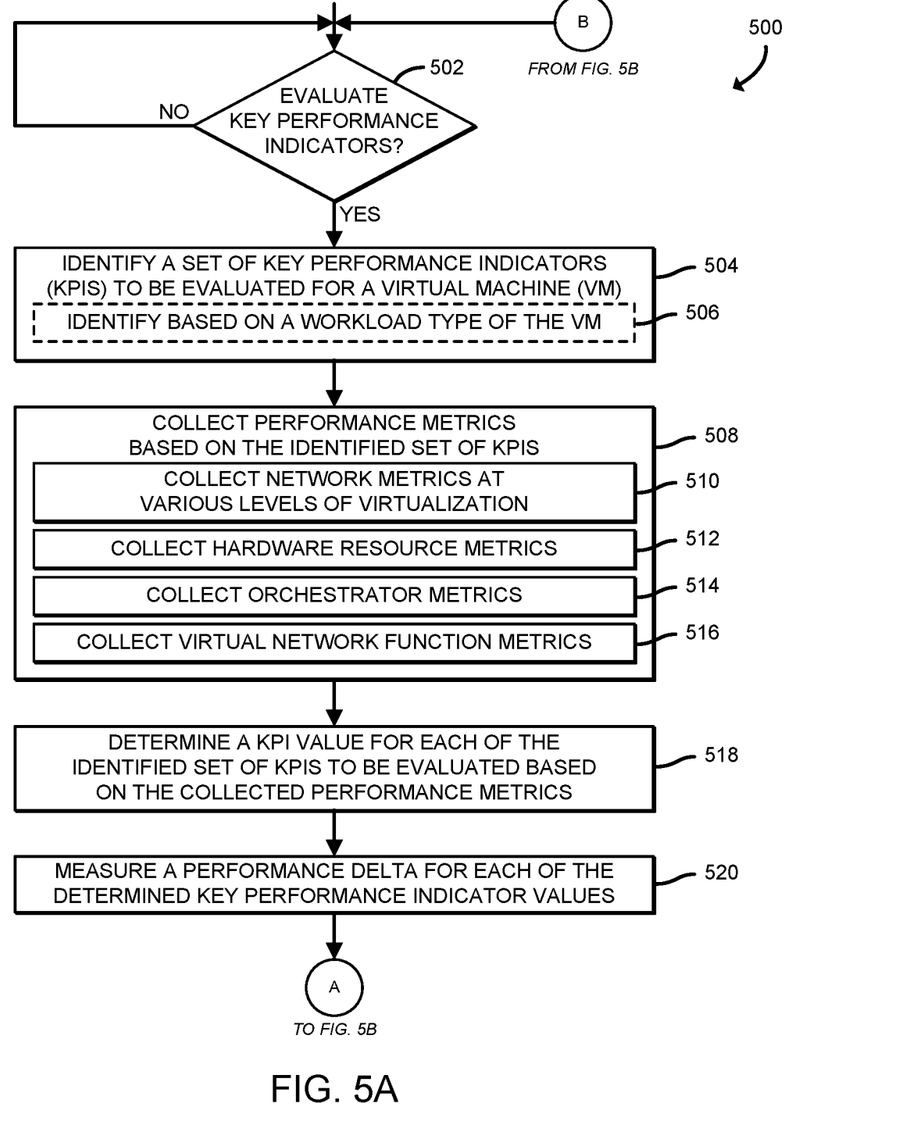
FIGS. 5A and 5B are a simplified flow diagram of at least one embodiment of a method for deploying VMs in the VNF infrastructure that may be executed by the intermediary compute device of FIGS. 1-3.
Figure 5B:
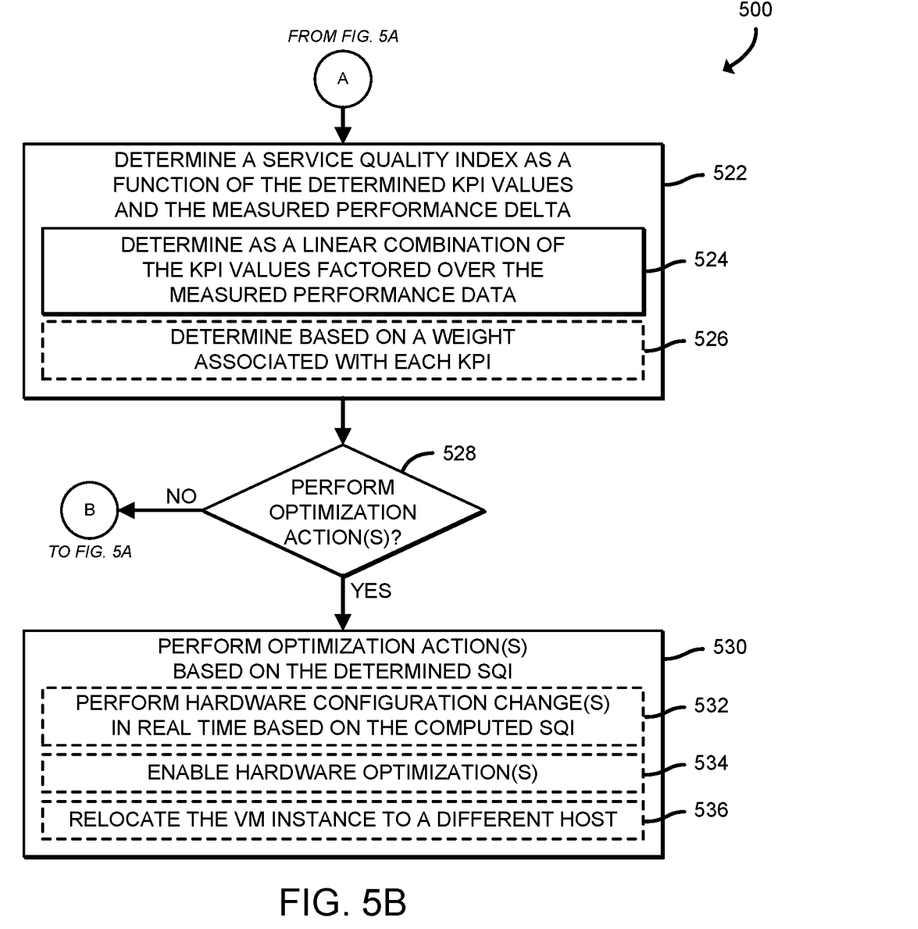

Referring now to FIGS. 5A and 5B, a method 500 for deploying VM instances (e.g., the VM instances 302 of FIG. 3) in a VNF infrastructure is shown, which may be executed by a compute device (e.g., the destination compute device 106 of FIGS. 1-3). The method 500 begins with block 502, in which the destination compute device 106 determines whether to evaluate key performance indicators (e.g., to update the service quality index for one or more VM instances). If so, the method 500 advances to block 504, in which the destination compute device 106 identifies the set of key performance indicators to be evaluated for a particular VM instance. For example, in block 506, the destination compute device 106 may identify the set of key performance indicators to be evaluated based on a workload type associated with the VM instance.

In block 508, the destination compute device 106 collects performance metrics from/about the various resources associated with the VM instance up/down the VNF infrastructure based on the identified set of key performance indicators. For example, in block 510, the destination compute device 106 collects network metrics (e.g., network traffic processing related statistics, ingress/egress queue related information, receive/transmit counters on MAC and physical layers, etc.) at various levels of virtualization (e.g., at a physical switch, a physical NIC, an uplink, a virtual switch (vSwitch)/VEB, a virtual NIC (vNIC), the data plane, etc.). Additionally, in block 512, the destination compute device 106 collects hardware resource metrics (e.g., compute, memory, etc.). In block 514, the destination compute device 106 additionally collects orchestrator metrics, such as an amount of registered services, service lookup times, a client discovery count, a number of connection retries, an amount of connection failures, etc. Further, in block 516, the destination compute device 106 collects VNF metrics, which may include a number of VM stalls, a VM premature release ratio, a VM scheduling latency, a network packet processing latency, a network packet delivery latency, a VM clock error, etc.

In block 518, the destination compute device 106 determines a key performance indicator value for each of the identified set of key performance indicators to be evaluated fro the VM instance based on the collected performance metrics. In block 520, the destination compute device 106 measures a performance delta for each of the determined key performance indicator values. In block 522, as shown in FIG. 5B, the destination compute device 106 determines a service quality index as a function of the determined key performance indicator values and the measured performance delta for each of a corresponding one of the key performance indicator values.

For example, in block 524, the destination compute device 106 determines the service quality index as a linear combination of the key performance indicator values factored over the measured performance data. Additionally, in some embodiments, in block 526, the destination compute device 106 may further determines the service quality index based on a weight associated with each key performance indicator. In other words, the destination compute device 106 may determine the service quality index based on a level of importance of each key performance indicator relative to a level of importance for each of the other key performance indicators. In such embodiments, the level of importance may be related to the workload type associated with the respective VM instance for which the service level indicator is being determined/updated.

In block 528, the destination compute device 106 determines whether to perform one or more optimization actions. To do so, for example, the destination compute device 106 may identify a minimum threshold value (i.e., that indicates a minimum acceptable service quality level) and compare the minimum threshold value against the determine service quality index. Based on a result of the comparison, the destination compute device 106 may either determine that the service quality index is already at or exceeds an acceptable service quality level and no such optimization actions are necessary to be performed, or the service quality index is less than the acceptable service quality level and that one or more optimization actions are necessary to be performed. Accordingly, if the destination compute device 106 determines not perform one or more optimization actions in block 528, the method 500 returns back to block 502, in which the destination compute device 106 determines whether to evaluate the key performance indicators again (e.g., to update the service quality index); otherwise, the method 500 advances to block 530.

In block 530, the destination compute device 106 performs the one or more optimized actions based on the determined service quality index. To do so, for example, in block 532, the destination compute device 106 may be configured to perform one or more hardware configuration changes in real time to create optimized flows based on the current workload associated with the virtual machine instance. Additionally or alternatively, in block 534, the destination compute device 106 may enable one or more hardware optimizations, such as turning on hardware offloads, supporting large pages, adjusting the memory access priority, data plane processor pinning, and/or any other relevant enhanced platform awareness features. It should be appreciated that, depending on the embodiment, additional tuning may be performed by the destination compute device

106, such as virtual switch/router tuning, including load balancing, pinning, learned routing optimizations, etc.

Further, in block 536, the destination compute device 106 may additionally or alternatively relocate the virtual machine instance to a different host, or more particularly to a different processor/processor core. For example, faults such as VM stalls can lead to lower performance and a lower service quality index, which may not be acceptable to end users of the VNF running on the VM instance. Accordingly, the destination compute device 106 may be configured to assess the impact, identify the root cause of the stall event, and activate failover mechanisms where the VM instance is placed at a location where the duration or frequency of the stall can be mitigated.

While illustratively described herein as being a specific implementation of predictively placing VMs in an optimal location, it should be appreciated that the operations described herein are usable to automatically tune hardware to dynamically adjust throughput and/or latency, depending on the use-case, thereby enabling optimal packet processing (e.g., relative to not automatically tuning the hardware). In other words, throughput and/or latency is measured up or down the stack through the layers of the VNF infrastructure, which is usable to determine the service quality index (i.e., a characterization of current system telemetry data), which is in turn usable to automatically tune the hardware to dynamically adjust throughput and/or latency, such as may be performed in the wireless core in 4G/5G networks.

EXAMPLES

Illustrative examples of the technologies disclosed herein are provided below. An embodiment of the technologies may include any one or more, and any combination of, the examples described below.

Example 1 includes a compute device for deploying virtual machines (VMs) in a virtual network function (VNF) infrastructure, the compute device comprising performance monitoring circuitry configured to collect a plurality of performance metrics based on a set of key performance indicators; service quality index evaluation circuitry configured to determine a key performance indicator value for each of the set of key performance indicators based on the collected plurality of performance metrics, and determine a service quality index for a virtual machine (VM) instance of a plurality of VM instances managed by the compute as a function each key performance indicator value; and VM configuration optimization circuitry configured to determine whether the determined service quality index is acceptable, and perform, in response to a determination that the determined service quality index is not acceptable, an optimization action to ensure the VM instance is deployed on an acceptable host of the compute device.

Example 2 includes the subject matter of Example 1, and wherein to collect the plurality of performance metrics comprises to (i) identify a workload type associated with a VM instance, (ii) determine the set of key performance indicators based on the identified workload type, and (iii) collect the plurality of performance metrics based on the determined set of key performance indicators.

Example 3 includes the subject matter of any of Examples 1 and 2, and wherein to collect the performance metrics comprises to collect network metrics at a plurality of levels of virtualization.

Example 4 includes the subject matter of any of Examples 1-3, and wherein to collect the collect network metrics at a plurality of levels of virtualization comprises to collect at least one of a network traffic processing related statistic, ingress queue information, egress queue information, a receive counter value at a physical layer, a receive counter value at a media access control (MAC) layer, a transmit counter value at the MAC layer, and a transmit counter at the physical layer.

Example 5 includes the subject matter of any of Examples 1-4, and wherein to collect the performance metrics comprises to collect hardware resource metrics associated with one or more hardware resources of the compute device.

Example 6 includes the subject matter of any of Examples 1-5, and wherein to collect the hardware resource metrics comprises to collect at least one of processor utilization metrics and memory utilization metrics.

Example 7 includes the subject matter of any of Examples 1-6, and wherein to collect the performance metrics comprises to collect orchestrator metrics associated with a service orchestrator of the compute device.

Example 8 includes the subject matter of any of Examples 1-7, and wherein to collect the orchestrator metrics comprises to collect at least one of an amount of registered services, a service lookup time, a client discovery count, a number of connection retries, and an amount of connection failures.

Example 9 includes the subject matter of any of Examples 1-8, and wherein to collect the performance metrics comprises to collect virtual network function metrics associated with the VM instance, and wherein to collect the virtual network function metrics comprises to collect at least one of a number of a VM stall count, a VM premature release ratio, a VM scheduling latency, and a VM clock error.

Example 10 includes the subject matter of any of Examples 1-9, and wherein the service quality index evaluation circuitry is further configured to measure a performance delta for each of the determined key performance indicator values, and wherein to determine the service quality index for the VM instance further comprises to determine the service quality index for the VM instance based on each measured performance delta.

Example 11 includes the subject matter of any of Examples 1-10, and wherein the compute device additionally includes VM placement prediction circuitry configured to identify which VM instance of the plurality of VM instances is the acceptable VM instance based on a corresponding service quality index of each of the plurality of VM instances.

Example 12 includes the subject matter of any of Examples 1-11, and wherein to determine whether the determined service quality index is acceptable comprises to determine whether the determined service quality index is greater than or equal to a minimum acceptable service quality level.

Example 13 includes the subject matter of any of Examples 1-12, and wherein to perform the optimization action comprises to one of (i) perform one or more hardware configuration changes on hardware of the compute device associated with the VM instance, (ii) enable one or more hardware optimizations, or (iii) relocate the VM instance to a different host of the compute device.

Example 14 includes one or more machine-readable storage media comprising a plurality of instructions stored thereon that, in response to being executed, cause a compute device to collect a plurality of performance metrics based on a set of key performance indicators; determine a key performance indicator value for each of the set of key performance indicators based on the collected plurality of performance metrics; determine a service quality index for a virtual machine (VM) instance of a plurality of VM instances managed by the compute as a function each key performance indicator value; determine whether the determined service quality index is acceptable; and perform, in response to a determination that the determined service quality index is not acceptable, an optimization action to ensure the VM instance is deployed on an acceptable host of the compute device.

Example 15 includes the subject matter of Example 14, and wherein to collect the plurality of performance metrics comprises to (i) identify a workload type associated with a VM instance, (ii) determine the set of key performance indicators based on the identified workload type, and (iii) collect the plurality of performance metrics based on the determined set of key performance indicators.

Example 16 includes the subject matter of any of Examples 14 and 15, and wherein to collect the performance metrics comprises to collect network metrics at a plurality of levels of virtualization.

Example 17 includes the subject matter of any of Examples 14-16, and wherein to collect the performance metrics comprises to collect hardware resource metrics associated with one or more hardware resources of the compute device.

Example 18 includes the subject matter of any of Examples 14-17, and wherein to collect the performance metrics comprises to collect orchestrator metrics associated with a service orchestrator of the compute device.

Example 19 includes the subject matter of any of Examples 14-18, and wherein to collect the performance metrics comprises to collect virtual network function metrics associated with the VM instance, and wherein to collect the virtual network function metrics comprises to collect at least one of a number of a VM stall count, a VM premature release ratio, a VM scheduling latency, and a VM clock error.

Example 20 includes the subject matter of any of Examples 14-19, and wherein the plurality of instructions further cause the compute device to measure a performance delta for each of the determined key performance indicator values, and wherein to determine the service quality index for the VM instance further comprises to determine the service quality index for the VM instance based on each measured performance delta.

Example 21 includes the subject matter of any of Examples 14-20, and wherein the plurality of instructions further cause the compute device to identify which VM instance of the plurality of VM instances is the acceptable VM instance based on a corresponding service quality index of each of the plurality of VM instances.

Example 22 includes the subject matter of any of Examples 14-21, and wherein to determine whether the determined service quality index is acceptable comprises to determine whether the determined service quality index is greater than or equal to a minimum acceptable service quality level.

Example 23 includes the subject matter of any of Examples 14-22, and wherein to perform the optimization action comprises to one of (i) perform one or more hardware configuration changes on hardware of the compute device associated with the VM instance, (ii) enable one or more hardware optimizations, or (iii) relocate the VM instance to a different host of the compute device.

Example 24 includes a compute device for deploying virtual machines (VMs) in a virtual network function (VNF) infrastructure, the compute device comprising circuitry to collect a plurality of performance metrics based on a set of key performance indicators; circuitry to determine a key performance indicator value for each of the set of key performance indicators based on the collected plurality of performance metrics; means for determining a service quality index for a virtual machine (VM) instance of a plurality of VM instances managed by the compute as a function each key performance indicator value; means for determining whether the determined service quality index is acceptable; and means for performing, in response to a determination that the determined service quality index is not acceptable, an optimization action to ensure the VM instance is deployed on an acceptable host of the compute device.

Example 25 includes the subject matter of Example 24, and further including means for measuring a performance delta for each of the determined key performance indicator values, wherein the means for determining the service quality index for the VM instance further comprises means for determining the service quality index for the VM instance based on each measured performance delta.

The invention claimed is:

1. A compute device for deploying virtual machines (VMs) in a virtual network function (VNF) infrastructure, the compute device comprising:
   circuitry to:
      collect a plurality of metrics to be evaluated for a VM instance managed by the compute device, the plurality of metrics to include network metrics and hardware metrics, wherein the network metrics include ingress queue information and egress queue information for a virtual switch, a receive counter value at a physical layer, a receive counter value at a media access control (MAC) layer, a transmit counter value at the MAC layer, and a transmit counter at the physical layer, wherein the hardware metrics include a processor utilization metric and a memory utilization metric;
      determine a service quality index value for the VM instance based on the collected metrics;
      compare the determined service quality index value to a threshold service quality index value associated with a service level agreement for the VM instance to process a workload, the workload associated with a virtual network function; and
      adjust, based on the comparison indicating the determined service quality index value is below the threshold service quality index value, a hardware configuration of the compute device arranged to support the VM instance to process the workload.

2. The compute device of claim 1, wherein to collect the plurality of metrics comprises to (i) identify a workload type for the workload to be processed by the VM instance, (ii) determine a set of key performance indicators based on the identified workload type, and (iii) collect the plurality of metrics based on the determined set of key performance indicators.

3. The compute device of claim 1, wherein the processor utilization metric includes a processor response time, a processor wait time, or a processor utilization percentage.

4. The compute device of claim 1, wherein the memory utilization metric includes host memory usage data, guest memory usage data, page sharing, memory bandwidth monitoring, or compression related data.

5. The compute device of claim 1, wherein to collect the plurality of metrics further comprises to collect orchestrator metrics associated with a service orchestrator of the compute device.

6. The compute device of claim 5, wherein to collect the orchestrator metrics comprises to collect an amount of registered services, a service lookup time, a client discovery count, a number of connection retries, or an amount of connection failures.

7. The compute device of claim 1, wherein to collect the plurality of metrics further comprises to collect virtual network function metrics associated with the VM instance processing the workload associated with the virtual network function, and wherein to collect the virtual network function metrics includes to collect a number of a VM stall count, a VM premature release ratio, a VM scheduling latency, or a VM clock error.

8. The compute device of claim 1, wherein to adjust the hardware configuration of the compute device comprises turning on hardware offloads, supporting large pages, adjusting a memory access priority, or data plane processor pinning.

9. One or more non-transitory machine-readable storage media comprising a plurality of instructions stored thereon that, in response to being executed, cause a compute device to:
collect a plurality of metrics to be evaluated for a virtual machine (VM) instance managed by the compute device, the plurality of metrics to include network metrics and hardware metrics, wherein the network metrics include ingress queue information and egress queue information for a virtual switch, a receive counter value at a physical layer, a receive counter value at a media access control (MAC) layer, a transmit counter value at the MAC layer, and a transmit counter value at the physical layer, wherein the hardware metrics include a processor utilization metric and a memory utilization metric;
determine a service quality index value for the VM instance based on the collected metrics;
compare the determined service quality index value to a threshold service quality index value associated with a service level agreement for the VM instance to process a workload, the workload associated with a virtual network function; and
adjust, based on the comparison indicating the determined service quality index value is below the threshold service quality index value, a hardware configuration of the compute device arranged to support the VM instance to process the workload.

10. One or more non-transitory machine-readable storage media of claim 9, wherein to collect the plurality of metrics comprises to (i) identify a workload type for the workload to be processed by the VM instance, (ii) determine a set of key performance indicators based on the identified workload type, and (iii) collect the plurality of metrics based on the determined set of key performance indicators.

11. The one or more non-transitory machine-readable storage media of claim 9, wherein the processor utilization metric includes a processor response time, a processor wait time, or a processor utilization percentage and the memory utilization metric includes host memory usage data, guest memory usage data, page sharing, memory bandwidth monitoring, or compression related data.

12. The one or more non-transitory machine-readable storage media of claim 9, wherein to collect the plurality of metrics further comprises to collect orchestrator metrics associated with a service orchestrator of the compute device.

13. The one or more non-transitory machine-readable storage media of claim 9, wherein to collect the plurality of metrics further comprises to collect virtual network function metrics associated with the VM instance processing the workload associated with the virtual network function, and wherein to collect the virtual network function metrics includes to collect a number of a VM stall count, a VM premature release ratio, a VM scheduling latency, or a VM clock error.

14. The one or more non-transitory machine-readable storage media of claim 9, wherein to adjust the hardware configuration of the compute device comprises turning on hardware offloads, supporting large pages, adjusting a memory access priority, or data plane processor pinning.

* * * * *